US009221050B2

(12) United States Patent
Etheredge, III et al.

(10) Patent No.: US 9,221,050 B2
(45) Date of Patent: Dec. 29, 2015

(54) CONDUCTIVE PATTERNS AND METHODS FOR MAKING CONDUCTIVE PATTERNS

(75) Inventors: Robert Winston Etheredge, III, Natick, MA (US); Aaron Oppenheimer, Cambridge, MA (US)

(73) Assignee: Daktari Diagnostics, Inc., Cambridge, MA (US)

( * ) Notice: Subject to any disclaimer, the term of this patent is extended or adjusted under 35 U.S.C. 154(b) by 374 days.

(21) Appl. No.: 13/464,555

(22) Filed: May 4, 2012

(65) Prior Publication Data

US 2012/0279298 A1 Nov. 8, 2012

Related U.S. Application Data

(60) Provisional application No. 61/518,399, filed on May 5, 2011.

(51) Int. Cl.

*C23C 28/00* (2006.01)
*G01N 27/26* (2006.01)
*B01L 3/00* (2006.01)

(52) U.S. Cl.

CPC ..... *B01L 3/502707* (2013.01); *B01L 3/502746* (2013.01); *B01L 2300/0645* (2013.01); *B01L 2300/0825* (2013.01); *B01L 2300/161* (2013.01); *B01L 2400/0406* (2013.01); *B01L 2400/086* (2013.01); *B01L 2400/088* (2013.01)

(58) Field of Classification Search

CPC ......... B23B 38/04; C23C 38/00; G01N 27/26
USPC ........................................................... 73/431
See application file for complete search history.

(56) References Cited

U.S. PATENT DOCUMENTS

| | | | | |
|---|---|---|---|---|
| 4,895,735 | A | 1/1990 | Cook | |
| 6,139,947 | A | 10/2000 | Miyakusa et al. | |
| 7,819,161 | B2 | 10/2010 | Neel | |
| 7,833,379 | B2 * | 11/2010 | Matsuoka et al. | 156/251 |
| 8,603,308 | B2 * | 12/2013 | Bhullar et al. | 204/403.01 |

(Continued)

FOREIGN PATENT DOCUMENTS

| | | | |
|---|---|---|---|
| CN | 103808776 A | * | 5/2014 |
| DE | 10 2006 031849 | | 1/2008 |

(Continued)

OTHER PUBLICATIONS

International Search Report and Written Opinion in International Application No. PCT/US2012/036598, mailed Nov. 30, 2012, 9 pages.

(Continued)

*Primary Examiner* — Lisa Caputo
*Assistant Examiner* — Jamel Williams
(74) *Attorney, Agent, or Firm* — Fish & Richardson P.C.

(57) ABSTRACT

This document provides conductive patterns, electrical sensors including conductive patterns, and methods of making conductive patterns used in electrical sensors. In some cases, the conductive patterns can define one or more microelectrodes. For example, thermal transfer printing techniques are described. In some cases, a microfluidics device can include one or more microelectrodes in a micro-channel.

96 Claims, 10 Drawing Sheets

(56) References Cited

U.S. PATENT DOCUMENTS

| | | | | |
|---|---|---|---|---|
| 2005/0016844 | A1 | 1/2005 | Burke et al. | |
| 2005/0178674 | A1 | 8/2005 | Hyland et al. | |
| 2008/0057233 | A1 | 3/2008 | Harrison et al. | |
| 2009/0056120 | A1 | 3/2009 | Bhullar et al. | |
| 2011/0000785 | A1 * | 1/2011 | Bhullar et al. | 204/403.01 |
| 2012/0013392 | A1 * | 1/2012 | Rothberg et al. | 327/509 |

FOREIGN PATENT DOCUMENTS

| | | |
|---|---|---|
| EP | 1 464 953 | 10/2004 |
| EP | 2148191 | 1/2010 |
| WO | WO 2011/009422 | 1/2011 |

OTHER PUBLICATIONS

Supplementary Partial European Search Report in European Application No. EP 12 77 9751, issued Nov. 18, 2014, 5 pages.

Written Opinion by the Danish Patent and Trademark Office on behalf of the Intellectual Property Office of Singapore in Singapore Patent Application No. 201308199-7, dated Sep. 9, 2014, 11 pages.

European Search Report for Application No. 12779751 dated Mar. 9, 2015, 5 pages.

Written Opinion by the Danish Patent and Trademark Office on behalf of the Intellectual Property Office of Singapore for Singapore Application No. 2013081997, mailed Jun. 19, 2015, 11 pages.

* cited by examiner

CONDUCTIVE PATTERNS AND METHODS FOR MAKING CONDUCTIVE PATTERNS

CROSS-REFERENCE TO RELATED APPLICATIONS

This application claims the benefit of U.S. Provisional Application Ser. No. 61/518,399, filed May 5, 2011. The disclosure of the prior application is considered part of (and is incorporated by reference in) the disclosure of this application.

TECHNICAL FIELD

This document relates to conductive patterns and methods for making conductive patterns. For example, this document provides thermal transfer printing techniques configured to produce one or more conductive patterns attached to a solid support. This document also provides conductive patterns produced using thermal transfer printing techniques as well as sensors configured to include one or more conductive patterns produced using thermal transfer printing techniques. In addition, this document provides thermal transfer printing devices and transfer printing systems adapted to produce one or more conductive patterns attached to a solid support.

BACKGROUND

Diagnosing diseases can involve using platforms that analyze a wide range of biomarkers. Examples of current techniques for detecting biomarkers include culture enrichment techniques for detecting target cells; ELISA for detecting proteins; and DNA microarrays for detecting nucleic acids. These techniques suffer from a few limitations: 1) they can be time consuming, often requiring several days to complete; 2) they can be expensive, running from tens to thousands of dollars per test; and 3) they can be complex, requiring skilled technicians working in specialized laboratories. These limitations have impeded the development of low-cost clinical diagnostics that can be used affordably in pharmacies, doctors' offices, and even by patients in the home.

Lateral flow immunochromatographic assays, also known as "dipsticks" or "rapid tests", have enabled point-of-care commercial tests for some proteins present in high concentration (i.e., nanomolar), such as pregnancy tests or HIV tests. These tests can be detected by eye, or by simple optical detectors. Glucose tests, based on catalytic electrochemical sensors, can detect some high abundance small molecules, with glucose testing being the major commercial application. Some microfluidic devices offer the possibility to detect cells, viruses, bacteria, nucleic acids, and low concentration proteins (i.e., sub-picomolar).

SUMMARY

This document provides conductive patterns and methods of making conductive patterns used in electrical sensors. The conductive pattern can include conductive traces. In some cases, a conductive pattern can include one or more microelectrodes. Conductive patterns provided herein can be at least partially located within one or more micro-channels of a microfluidics device to form a sensor. Such sensors can be used to detect and/or quantify target cells, viruses, bacteria, protein and peptide biomarkers, nucleic acid biomarkers, and other analytes.

This document also provides thermal transfer printing techniques for forming conductive patterns. "Thermal transfer printing" as used herein refers to a printing process where a transfer material on a first substrate is heated and placed against a receiving substrate to transfer the transfer material to the receiving substrate. For example, the first substrate in a thermal transfer printing process can be a backing layer of a thermal transfer ribbon that includes one or more layers of thermally-transferable conductive material. Selective portions of a thermal transfer ribbon can be heated by a thermal transfer printer to transfer a desired pattern of the thermally-transferable conductive material to a receiving substrate. Heating of select portions of the first substrate can cause the material to soften and/or melt, be released from the first substrate, and thermally bond to the receiving substrate, resulting in a secure attachment of the transferred material to the receiving substrate. In some cases, the transfer printed material can be transferred as an intact layer. The transfer printed material used to form a conductive pattern provided herein can include particles of conductive material having a small particle size to reduce the granularity of the transfer printed conductive pattern(s). The transfer printing techniques provided herein can be used reliably to produce conductive patterns at a high speed, thus allowing for mass production of electrical sensors having the conductive patterns provided herein.

A method for manufacturing an electric sensor can include thermal transfer printing a conductive pattern onto a non-conductive surface of a receiving substrate and securing the receiving substrate to at least a second substrate to form an enclosure. In some cases, the conductive pattern can define one or more conductive traces and/or microelectrodes. At least a portion of the conductive pattern can be positioned within the enclosure. In some cases, a power source can apply a voltage between two or more conductive traces and form a circuit including the conductive traces and any other substances in the enclosure between the conductive traces. Conductive traces also can be connected to a signal amplification device and/or a data acquisition device to measure and/or record the electrical signature (e.g., current, impedance, and conductance) across the channel. Because different constituents within the enclosure can have different conductivities, a measure of the current in the circuit can be used to calculate the electrical impedance of substances in the enclosure. A sensor can detect and analyze impedance data for a solution as a whole. The electrical impedance can be analyzed along with additional data (e.g., impedance data for known electrolyte solutions) to determine if specific constituents are present and/or to determine the amount of a particular constituent. In some cases, detecting and quantifying particular constituents can involve an array of specific analyte electrodes configured to each one.

A method is provided for manufacturing an electric sensor. The method includes thermal transfer printing a conductive pattern defining at least one conductive trace onto a surface of a receiving substrate. The conductive pattern can be printed with a thermal transfer printer having a printhead density of at least 300 dpi. In some cases, the printhead density can be at least 600 dpi, at least 900 dpi, or at least 1200 dpi. The method further includes securing at least a portion of the receiving substrate to at least a second substrate to form an enclosure. At least a portion of the conductive pattern is positioned within the enclosure. In some cases, the conductive pattern defines at least two electrodes positioned within a micro-channel of a microfluidic device. The conductive pattern can have one or more portions having a thickness of 1 micron or less and/or a width of 250 microns. In some cases, a conductive pattern can have one or more portions having a width of 50 microns or less. The conductive pattern can include interdigitated electrode segments. The conductive pattern can include aluminum, silver, platinum, iron, graphite, or a derivative or combination thereof. In some cases, the conductive pattern can include a conductive polymer. In some cases, a conductive material can be in the form of particles together with wax and/or resin matrix. In some cases, the enclosure includes a biological coating. The enclosure can hold or be adapted to hold a fluid (e.g., a reagent) in a liquid or vapor form.

An electric sensor including an enclosure and a plurality of thermal-transfer-printed conductive traces positioned at least partially within the enclosure is also provided. The transfer-printed conductive traces have at least one portion having a thickness of 1 micron or less and a width of between 1 micron and 500 microns. In some cases, the enclosure is a micro-channel of a microfluidic device and the plurality of conductive traces are at least partially positioned within the micro-channel. The conductive traces can include interdigitated microelectrodes. The conductive traces can have one or more portions having a thickness of 1 micron or less and/or a width of 250 microns or less. The conductive traces can include metallic or nonmetallic particles of aluminum, silver, platinum, iron, graphite, conductive polymer, or a derivative or combination thereof. One or more portions of the conductive traces can be printed on a biological or non-biological coating or themselves be coated with biological or non-biological materials. In some cases, the conductive traces have a first surface energy that is at least 5 Dynes/cm greater or less than a surface energy of a surrounding material.

A microfluidic sensor including a body defining at least a first microfluidic channel is provided. The microfluidic channel has at least one surface comprising at least two different materials. A first material has a first surface energy and a second material has a second surface energy that is at least 5 Dynes/cm greater than the first surface energy. The second material can include thermal transfer printed material. The second material can have a surface energy of greater than 45 Dynes/cm. The second material can have a surface energy of greater than 60 Dynes/cm. The second material can be conductive and/or nonconductive. In some case, the conductive material includes aluminum particles, optionally in a resin or wax matrix. In some cases, a conductive second material can be connected to a power source to apply a potential to the second material to change wetting properties of the second material. The first material can have a surface energy of less than 45 Dynes/cm. In some case, the first material can have a surface energy of less than 40 Dynes/cm. The first material can include pMMA. In some cases, a conductive pattern in a micro-channel can have a higher or lower surface energy than surrounding plastic with or without the addition of a coating.

An electric sensor can form part of a microfluidic device, and an enclosure of the microfluidic device can be a micro-channel having at least part of a thermal transfer printed conductive pattern positioned therein. In some cases, the thermal transfer printed conductive pattern can define two or more conductive traces each defining a plurality of microelectrodes. The thermal transfer printed conductive pattern can be formed on a receiving substrate, and at least a portion of the receiving substrate can be aligned and/or secured to a block structure to define a micro-channel there between. In some cases, the block structure also can define one or more inlets into the micro-channel and one or more outlets out of the micro-channel, through which samples and/or reagents can flow. A measure of electrical impedance of the sample placed in the micro-channel can be used alone or in combination with other tests and/or measurements to determine the contents of the sample. In some cases, the micro-channel can include reagents or other substances that interact with a sample placed in the micro-channel.

A conductive pattern provided herein can have segments (e.g., microelectrodes) having a thickness of 1 micron or less (e.g., less than 1.0 microns, less than 0.9 microns, less than 0.8 microns, less than 0.7 microns, less than 0.6 microns, or less than 0.5 microns). In some cases, a conductive pattern provided herein can have segments (e.g., microelectrodes) having a thickness that is between 0.5 microns and 1.0 microns, between 0.6 microns and 1.0 microns, between 0.7 microns and 1.0 microns, between 0.8 microns and 1.0 microns, between 0.9 microns and 1.0 microns, between 0.5 microns and 0.8 microns, or between 0.6 microns and 0.9 microns. In a microfluidic device, a conductive pattern thickness of greater than 1 micron can disrupt the laminar flow properties of a sample. A conductive pattern thickness of 1 micron or less can be located on a surface of the micro-channel without the conductive pattern disrupting the laminar flow of a sample introduced into the microfluidic channel.

In some cases, a conductive pattern can define two or more conductive traces each having a plurality of microelectrodes. The width and spacing of pairs and/or arrays of microelectrodes can determine the strength of the local electrical field, and thus can determine the sensitivity and threshold of detection of an electrochemical diagnostic method. Smaller widths and narrower spacing between electrodes can provide better resolution and can allow for detection of target analytes at picomolar, femtomolar, and even attomolar concentrations. In some cases, a microelectrode provided herein can have at least one portion having a width of 500 microns or less. For example, a microelectrode provided herein can have a width that is between 300 microns and 200 microns, between 200 microns and 100 microns, between 100 microns and 50 microns, between 50 microns and 10 microns, or between 20 microns and 5 microns. In some cases, a microelectrode provided herein can have multiple portions having multiple widths. In some cases, a microelectrode pair or a microelectrode array provided herein can have spacing between microelectrodes of 500 microns or less. For example, a microelectrode pair or array provided herein can have a between-electrode spacing that is between 300 microns and 200 microns, between 200 microns and 100 microns, between 100 microns and 50 microns, between 50 microns and 10 microns, or between 20 microns and 5 microns. In some cases, a microelectrode pair or array provided herein can have spacing that varies in different portions of the electrode. In some cases, a microelectrode pair or array provided herein can have a between-electrode spacing that is 500 microns or greater, 1 mm or greater, 5 mm or greater, or 1 cm or greater. Microelectrodes having fine and consistent dimensions can permit for more intricate microelectrode patterns and can have more sensitivity when detecting various constituents.

In some cases, the thermal transfer printing techniques provided herein can result in consistent conductive pattern widths and thicknesses in conductive patterns printed during a production run. In some cases, a method of printing conductive patterns can include printing a plurality of receiving substrates with the same predetermined conductive pattern. When printing at least 100 consecutive receiving substrates with the same conductive pattern having conductive traces having widths of between 100 microns and 200 microns, the transfer printing techniques provided herein can have a standard deviation of less than 10 microns, a range of less than 30 microns, and a tolerance range of less than ±15 for the conductive traces.

Because of the minimal variations within a production run, entire batches of sensors each having conductive patterns from the same production run can be calibrated using calibration procedures performed on only a subset of that batch of sensors. This procedure is sometimes referred to as lot sampling. Each sensor can have a one point calibration or correction of the calibration for an entire batch by calculating the electrical impedance for a known sample or fluid that enters an enclosure of the sensor. For example, the electrical impedance for a reagent added to a microfluidic channel can be used to calibrate or confirm the calibration of a microfluidic device. In some cases, each sensor can be independently calibrated. A sensor can be calibrated by passing multiple solutions of known conductivity into an enclosure including the conductive patterns to obtain data points to set a calibration slope or curve.

In some cases, conductive patterns of a sensor provided herein can be combined with integrated circuitry into a portable handheld device for multiplexed, high throughput analysis using an array of micro-channels for probing clinically relevant samples. For example, the conductive patterns provided herein can be used within a handheld device designed to analyze bodily fluids including human serum for intercellular or intracellular constituents, one or more polypeptide biomarkers, one or more nucleic acid biomarkers, one or more pathogenic organisms, or combinations thereof.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
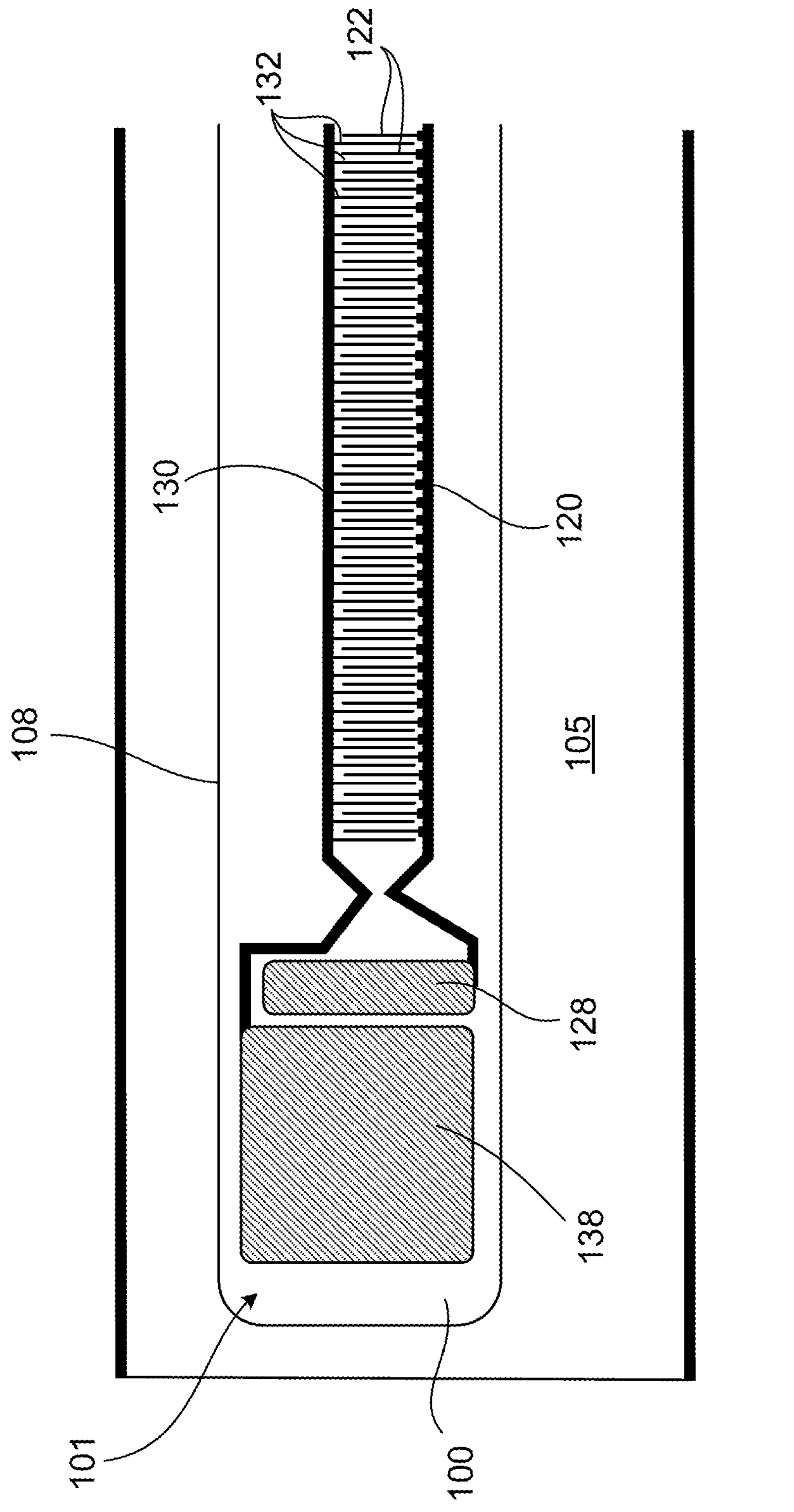
FIG. 1 is an example of a microelectrode sheet including a conductive pattern defining conductive traces.

This document provides conductive patterns and techniques for making conductive patterns, devices and systems containing conductive patterns, and transfer printing devices and transfer printing systems adapted to produce one or more conductive patterns attached to a solid support. The conductive patterns can include conductive traces. In some cases, the conductive patterns can define microelectrodes.

As described herein, thermal transfer printing includes the transfer of a desired material from a first substrate to a receiving substrate by placing the first substrate against the receiving substrate and heating. Any appropriate thermal transfer printer can be used to make the conductive patterns or sensors provided herein. Manufacturers of thermal transfer printers include Zebra, Intermec EasyCoder, Sato, Datamax, Toshiba, TEC, Citizen, Godex, Wasp, Brother, Fargo, Printronix, and Oki.

A thermal transfer printer prints by melting a coating of a transfer material on a first substrate (e.g., a backing layer of a ribbon) so that the transfer material is secured to the receiving substrate (e.g. solid surface used in an electric sensor) on which the print is applied. Thermal transfer printers can use a fixed width thermal printhead and a driven rubber roller (i.e., a platen). The receiving substrate and a thermal transfer ribbon can be passed between the printhead and platens. The thermal transfer ribbon can include a backing layer (the first substrate) and a transfer material. The ribbon can be spooled onto reels and driven through the printing mechanism in sync with the receiving substrate. As the receiving substrate and ribbon are driven beneath the printhead together, tiny pixels across the width of the printhead are heated and cooled so as to melt the transfer material off the backing layer and onto the receiving substrate.

Thermal printheads of thermal transfer printers used to make the conductive patterns provided herein have at least 300 dots per inch (dpi) in a 300×300 dot array. For example, a transfer printing device having a printhead density of 500×500 dpi or more, 600×600 dpi or more, or 1200 dpi or more can be used to make a conductive pattern or sensor provided herein. A larger dpi can increase the resolution of the transfer printed conductive patterns. In some cases, the printer can have a 1200 dpi×1200 dpi density to create consistently portions of one or more conductive patterns having widths of about 20 microns. In some cases, a printhead can have mixed densities. For example, a printhead could have 1200×600 dpi. In some cases, a thermal transfer printer having a throughput speed greater than 2 inches per second can be used. For example, a thermal transfer printer having a printing speed of between 2 and 12 inches per second can be used.

Thermal transfer printers can have internal processors and internal memory. In some cases, a thermal transfer printer having an internal description language can be used to allow a desired pattern of one or conductive patterns to be configured in the printer's memory prior to printing. In some cases, thermal transfer printers can be connected to a computer that provides printing instructions to the printer, either directly or indirectly. Printing instructions can be provided by CAD software on a computer or within the printer.

A thermal transfer ribbon used to make a conductive pattern provided herein can include a backing layer and a transfer material. In some cases, polyester film can be used as the backing layer. A transfer layer can include a conductive material, such as metals, alloys, conductive polymers, conductive ceramics, or a combination thereof. In some cases, a transfer layer includes multiple layers with at least one conductive layer. In some cases, the transfer printed material used to make a conductive pattern provided herein can include aluminum, silver, platinum, iron, graphite, or a combination thereof. For example, the transfer printed material can include aluminum particles. The conductive material can be provided within a matrix of wax and/or resin to facilitate the thermal transfer printing process. In some cases, the conductive material is in the form of particles within a resin and/or wax matrix. For example, nanoparticles of aluminum can be included in a resin matrix that is used to make a conductive pattern provided herein.

In some cases, a transfer printed material used to make a conductive pattern provided herein can include multiple layers of different materials, with at least one layer being conductive. A conductive layer of transfer material can have a thickness ranging between 1 micron and 0.01 microns. In some cases, a conductive layer of a conductive pattern provided herein can be between 0.05 microns and 0.5 microns or between 0.1 microns and 0.3 microns. In some cases, the total thickness of the transfer material can be 1 micron or less. For example, the total thickness of a transfer material can be between 1.0 and 0.1 microns, between 0.9 and 0.2 microns, or between 0.8 and 0.5 microns. In some cases, the thermal ribbon used to make a conductive pattern provided herein can include a release layer between the backing material and the transfer material. In some cases, the transfer material used to make a conductive pattern provided herein can be flexible. For example, the transfer material of a conductive pattern provided herein that is present on a flexible receiving substrate can flex with the receiving substrate without the transfer printed material cracking.

Examples of conductive thermal transfer ribbon that can be used to make a conductive pattern provided herein include those described by U.S. Pat. No. 6,139,947 to Miyakusa et al. (see col. 2, lines 32-39 describing the overall structure of a thermal transfer recording medium; col. 2, line 50-col. 3, line 19 describing the release layer; col. 3, lines 20-30 & col. 4, lines 6-18 describing the anchor layer; and col. 4, lines 19-30 describing the metal deposition layer; and col. 4, lines 31-47 describing the adhesive layer) and those sold by the IIMAK Corporation (Amherst, N.Y.) and ZeroNine Manufacturing Go., Inc. (Woodstock, Ill.). The thermal transfer ribbon can be made by a wet coating process using a roll-to-roll process to create a transfer layer having a thickness of about 0.8 microns on a backing material. The transfer layer can include an aluminum layer having a thickness of about 0.26 microns. In some cases, the aluminum layer can between about 0.03 microns and 0.16 microns.

The receiving substrate can include a non-conductive print-receiving surface. In some cases, the receiving substrate can include plastic. For example, the receiving substrate can include poly(methyl methacrylate), polyester, polystyrene, polycarbonate, polyolefin, cyclic olefin copolymer, silicone, polyurethane, starch-based materials, or any combination thereof. In some cases, the receiving substrate can be injection-molded into a desired shape. In some cases, the receiving substrate can be extruded or drawn into a film or sheet. For example, the receiving substrate of a device provided herein can be a flexible film or sheet of poly(methyl methacrylate). In some cases, the receiving substrate can include a woven or nonwoven material. In some cases, the receiving substrate can include spunbond or hydroentangled fibers. For example, the receiving substrate can include spunbond polyester fibers.

In some cases, the receiving substrate's print-receiving surface of a device provided herein can include a coating. For example, the receiving substrate can include a tie layer in order to promote adhesion between the receiving substrate and the transfer printed material of the microelectrode. In some cases, the tie material can be non-conductive. In some cases, a coating on the receiving substrate can include a biological material. In some cases, thermal transfer printing of microelectrodes can be completed without damaging biological materials on a receiving substrate. For example, a printhead of a thermal transfer printer provided herein can have a thermal duty cycle of about 10 milliseconds or less, and a short heating cycle can avoid damaging certain biological materials. As described herein, the thermal transfer process is capable of printing fine-featured conductive network patterns on or around coatings without damaging adjacent coated areas. For example, conductive patterns can be applied to a hydrogel coating used in microfluidic parts prior to hydration.

The receiving substrate can have a substantially-flat print-receiving surface. In some cases, the substrate can be embossed. For example, the surface of the substrate of a device provided herein can be embossed with indentations. The indentations can be configured to result in a break of contact with the printhead of the thermal transfer printer and thus interrupt the deposition of a conductive pattern. In some cases, the indentations can help ensure that the desired conductive pattern is formed. For example, indentations can permit two or more electrodes to be printed with very close points of approach (e.g., less than 25 microns, less than 20 microns, less than 15 microns, less than 10 microns, or less than 5 microns). This can improve the sensitivity of the sensor. In some cases, the indentations can have a depth of about 5 microns or greater (e.g., between 5 microns and 50 microns, between 10 microns and 40 microns, or between 15 microns and 30 microns) and a width of about 5 microns or greater (e.g., between 5 microns and 50 microns, between 10 microns and 40 microns, or between 15 microns and 30 microns). In some cases, the embossed depressions can form micro-channels themselves and can have thermal transfer printed microelectrodes positions on either side of the embossed microchannel. For example, an embossed micro-channel can have a depth of about 20 microns and a width of about 5 microns and can have microelectrodes provided herein printed on opposite sides of the opening at the top of the embossed micro-channel.

In some cases, the thermal sensitivity of transfer material can be used to form a desired pattern of conductive material after the transfer material is transferred to the receiving substrate. This process is sometimes called thermal ablation. For example, a receiving substrate can be selectively heated or cooled to remove the heated conductive material from the receiving substrate. For example, such a process can be used to ensure that a conductive pattern defining microelectrodes are properly isolated and spaced. In some cases, a first conductive pattern can be transfer printed and then altered into a second conductive pattern by selectively removing portions of the first conductive pattern. For example, a first conductive pattern can be continuous but portions thermally ablated to create a plurality of isolated microelectrodes. When the transfer material includes a resin or wax that melts at a lower temperature than the receiving substrate, selective portions of the transfer material can be thermally ablated without damaging the underlining receiving substrate.

In some cases, the thermal sensitivity of the transferred material can be used to create a thermal switch that, for example, can be used to deactivate a sensor. For example, the conductive thermal transfer material can have a maximum current density before the conductive thermal transfer material becomes unstable due to heat generated by the current, which can cause a resin or wax in the transferred material to soften. A portion of a conductive pattern can include a narrowed portion that can act as a fuse, and thus melt and break a circuit before the maximum current density is reached for the remainder of the conductive pattern.

As described herein, the receiving substrate can be rigid or flexible. The receiving substrate can be transfer printed with the desired microelectrode pattern and then secured to other elements. In some cases, the receiving substrate can be connected to other elements to form an enclosure (e.g., a micro-channel), with the conductive pattern including one or more microelectrodes facing the inside of the enclosure.

The transfer printing techniques provided herein can be used to create conductive patterns having fine and reproducible dimensions. In some cases, the conductive traces of the conductive patterns provided herein can have a thickness of 1 micron or less and a width of between 500 microns and 1 micron. For example, a microelectrode thickness of 1 micron or less can minimize disruptions to laminar flow within a micro-channel of a microfluidic device. In some cases, the conductive traces of the conductive patterns provided herein can have a width of less than 400 microns, less than 300 microns, less than 250 microns, less than 200 microns, less than 150 microns, less than 100 microns, less than 50 microns, less than 25 microns, less than 20 microns, less than 15 microns, less than 10 microns, or less than 5 microns. In some cases, the conductive traces of the conductive patterns provided herein can have a width of between 10 and 20 microns, between 15 and 30 microns, between 20 and 50 microns, between 30 and 100 microns, between 50 and 150 microns, between 100 and 300 microns, or between 200 and 500 microns. For example, the dimensions of the electrodes can influence the sensitivity of the sensors. In some cases, the conductive traces of the conductive patterns provided herein can have a thickness of 1.0 microns or less (e.g., 0.9 microns or less, 0.75 microns or less, 0.5 microns or less, 0.4 microns or less, 0.3 microns or less, 0.2 microns or less, or 0.1 microns or less). In some cases, the conductive traces of the conductive patterns provided herein can have a thickness of between 0.05 and 0.3 microns, of between 0.1 and 0.5 microns, between 0.3 and 0.7 microns, or between 0.5 and 1.0 microns. In some cases, a conductive trace can have a thickness that is between 1 and 5 microns, between 5 and 25 microns, or between 10 and 50 microns. The laminar flow of a sample might not impact certain types of sensors.

In some cases, the conductive patterns provided herein can be coated. For example, conductive pattern or a microelectrode provided herein can be coated with a hydrogel. The hydrogel can swell in response to environmental changes to provide a conductimetric reading. In some cases, a coating material can be used to control sensor selectivity. For example, ion selective electrode (ISE) sensors can be formed using the techniques provided herein.

In some cases, the conductive pattern provided herein or a portion thereof can be adapted to lyse cells. For example, a first set of electrodes (e.g., silver or platinum electrodes) can provide a high field strength to lyse cells. For example, a micro-channel of a microfluidic device provided herein can include a first segment to lyse cells and a second segment to measure the impedance of the fluid downstream of the first segment. In some cases, measuring electrodes can be co-located with lysing electrodes. In some cases, the lysing potential can be removed and electrodes can be used to measure impedance of a resulting solution. The first segment can include a first set of thermal transfer printed microelectrodes containing silver and/or platinum that use a high field strength to lyse cells, and the second segment can include thermal transfer printed microelectrodes that detect the absence or presence of certain biomaterials expected to be released from the lysed cells.

In some cases, transfer printed material can alter flow patterns within a microfluidic channel For example, a pattern of relatively hydrophobic transfer printed material on a less hydrophobic receiving substrate can influence flow behavior and/or a mixing behavior of a fluid flowing along a micro-channel of a microfluidic device. Relatively hydrophilic and/or hydrophobic transfer material can be deposited onto the receiving substrate in a variety of patterns designed to achieve a specific flow pattern. The hydrophobic and/or hydrophilic characteristics of a material can be quantified by a material's surface energy. The transfer printed material can have a different surface energy than receiving substrate. In some cases, the thermal transfer printed material has a surface energy that is at least 5 Dynes/cm greater than the surface energy of the receiving substrate (e.g., at least 10 Dynes/cm greater, at least 15 Dynes/cm greater, at least 20 Dynes/cm greater, at least 25 Dynes/cm greater, or at least 30 Dynes/cm greater). In some cases, transfer printed material provided herein has a surface energy of greater than 45 Dynes/cm (e.g., greater than 50 Dynes/cm, greater than 55 Dynes/cm, greater than 60 Dynes/cm, between 45 and 100 Dynes/cm, between 50 and 80 Dynes/com, or For example, a receiving substrate can include pMMA having a surface energy of about 38 Dynes/cm and a transfer printed material can have a surface energy of greater than about 60 Dynes/cm. In some cases, the thermal transfer printed material has a surface energy that is at least 5 Dynes/cm less than the surface energy of the receiving substrate (e.g., at least 10 Dynes/cm less, at least 15 Dynes/cm less, at least 20 Dynes/cm less, at least 25 Dynes/cm less, or at least 30 Dynes/cm less). The difference in surface energies can alter and/or stabilize the flow of fluid in a channel (e.g., a micro-channel of a microfluidics device), regardless of whether the transfer printed material projects out of the surface of the receiving substrate. In some cases, a conductive pattern having a thickness of 1 micron or less can alter the flow of a fluid passing through a micro-channel.

In some cases, a transfer printed material can be printed as parallel lines transverse to the fluid flow direction of a micro-channel. A transverse pattern of transfer material having a different surface energy than a receiving substrate can smooth out the flow across the width of the micro-channel; the transfer material causing the fluid front to spread across the channel width. In some case, a transfer printed material can be printed as parallel lines extending longitudinal to the fluid flow direction of a micro-channel. A longitudinal pattern of transfer material having a different surface energy than a receiving substrate can result in varying flow rates across the width of the micro-channel; the transfer material acting as lane dividers that interfere with the movement of fluid across the width of the micro-channel. In some cases, a transfer printed material can be printed in a variety of other shapes in a variety of sizes to either encourage or discourage mixing and/or create desired flow patterns within a micro-channel.

In some cases, deposits of conductive transfer printed material can be electrically connected to a power source. The power source can selectively apply a potential to different deposits of the conductive transfer printed material to change a solid-fluid contact angle between the transfer material and the fluid in the enclosure (e.g., a micro-channel of a microfluidic device). This phenomenon, known as "electrowetting," can be used to actively change the fluid flow dynamics in a micro-channel. For example, a series of conductive transfer material deposits can selectively receive a pulse from a power source to create a pulsed flow of fluid.

Conductive patterns provided herein can be incorporated into microfluidic devices. FIG. 1 is top view of an exemplary pattern of microelectrodes adapted for use in a microfluidic device. Using thermal transfer printing techniques, the depicted conductive pattern 101 can be printed on a receiving substrate 105. For example, the receiving substrate 105 can be a sheet of pMMA material. Receiving substrate 105 can be cut along line 108 to form a microelectrode sheet 100 adapted to fit within a recess of a block structure to form a micro-channel of a microfluidic device.

With further reference to FIG. 1, conductive pattern 101 includes 2 conductive traces 120 & 130 that are each electrically isolated from each other on microelectrode sheet 100. Each conductive trace 120 & 130 includes a contact pad 128 & 138. These contact pads can interface with an instrument to read impedance data of a solution in the micro-channel by applying a voltage to the contact pads. Contact pads 128, 138, 148, 158, and 168 can be used to test continuity of the pattern by probing pairs of pads to ensure the conductive lines are not broken prior to use. Each conductive trace 120 & 130 includes a plurality of interdigitated microelectrodes 122 & 132. Microelectrodes 122 can interditgitate with microelectrodes 162. The sensitivity of the sensor can be improved by having interdigitating microelectrodes. As the number of pairs of microelectrodes increases, the sensitivity of the interdigitated array is increased. Surface resistivity is proportional to the electrode spacing divided by the total electrode length. The total length is increased by adding interdigitated pairs or microelectrodes. Each interdigitated microelectrode 122 & 132 can have a thickness of 1 micron or less and a width of about 150 microns (with a standard deviation of about 6 microns or less). The spacing between the interdigitated microelectrodes can be about 250 microns. Microelectrodes having smaller widths and more closely spaced can be produced. For example, microelectrodes can have a width of about 100 microns, about 50 microns, or about 20 microns, with a spacing that is between 5 microns and 100 microns.

Figure 2:
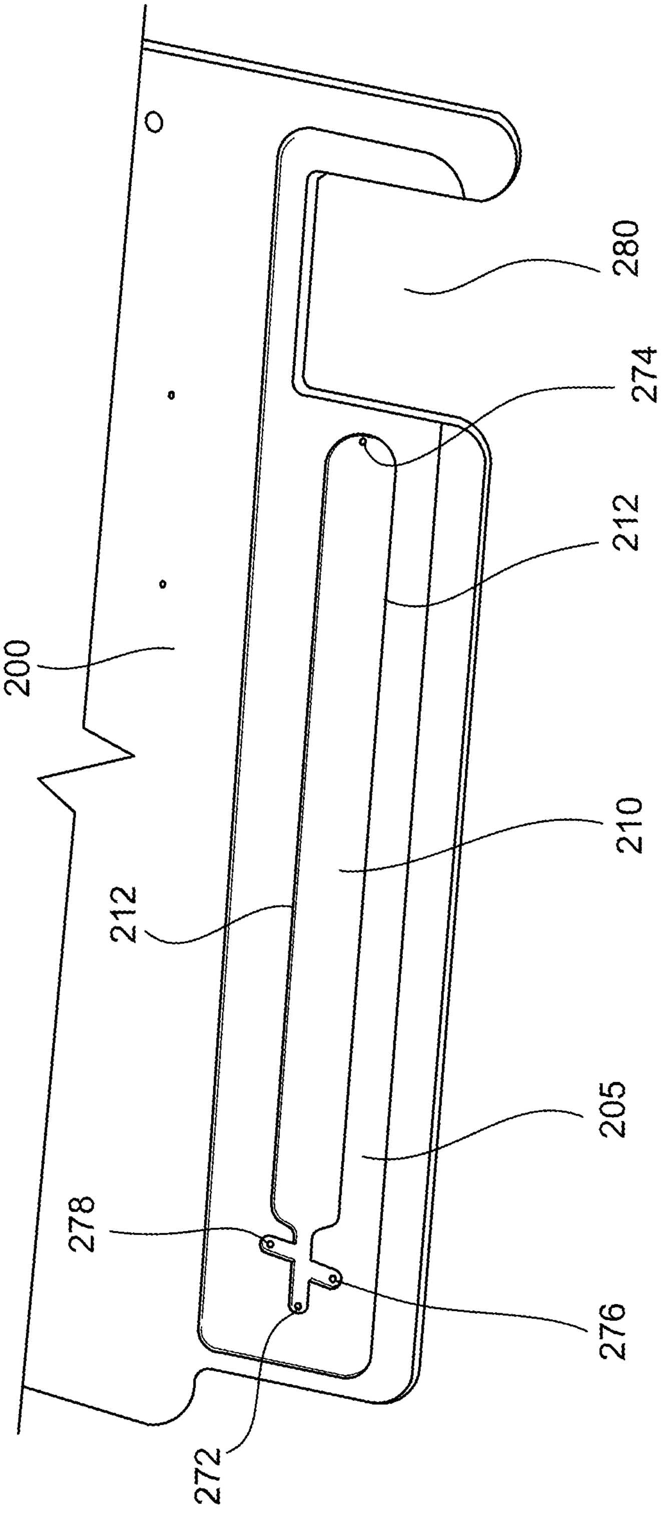
FIG. 2 is a top view of a block structure adapted to receive a microelectrode sheet to define a micro-channel of a microfluidic device.
Figure 3:
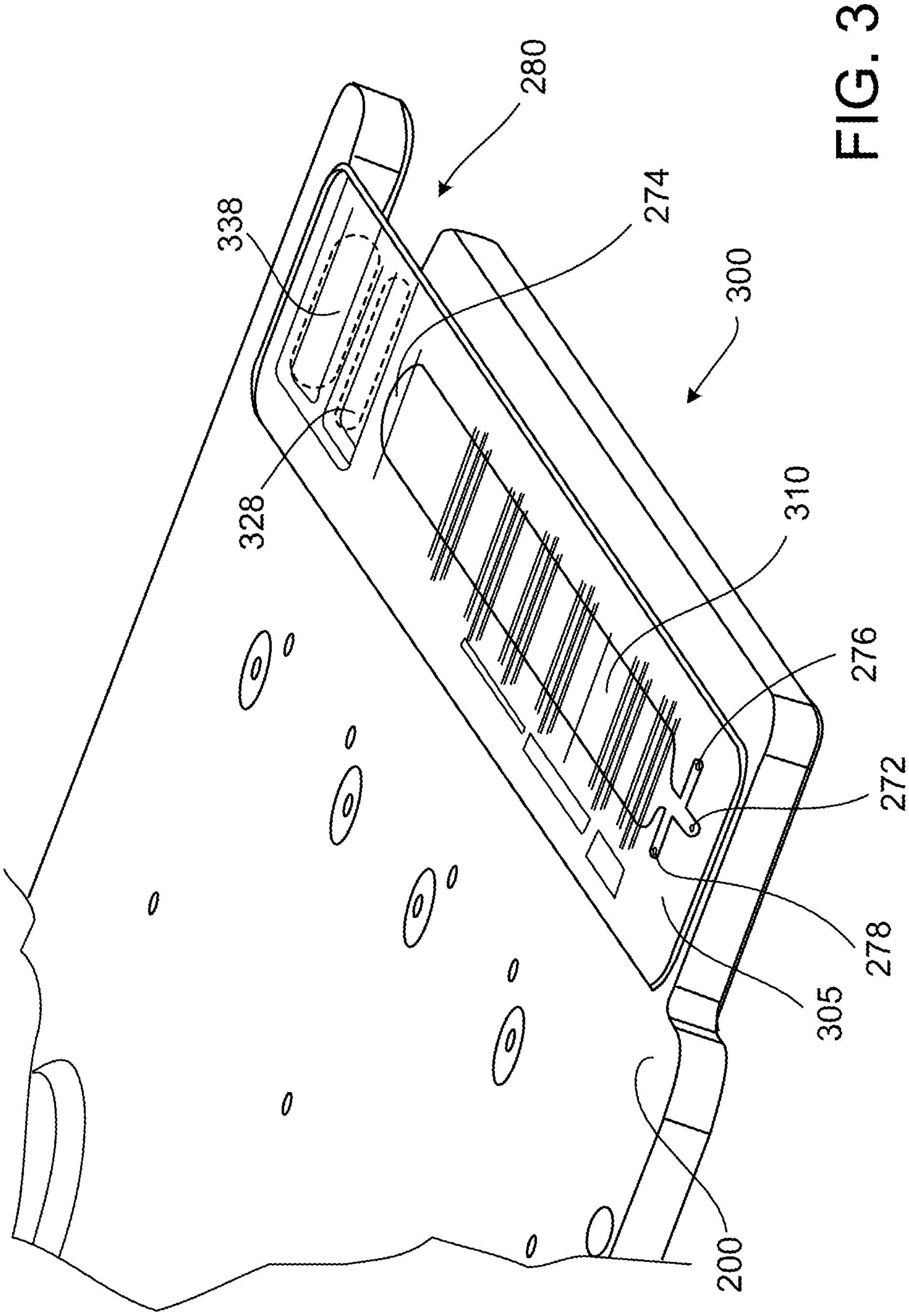
FIG. 3 is a perspective view of a portion of a microfluidic device having a block structure secured to a microelectrode sheet to define a micro-channel.

With reference to FIG. 2, a block structure 200 is adapted to receive a microelectrode sheet (such as that discussed above in reference to FIG. 1 or those discussed below in reference to FIGS. 5A, 5B, 6A-6C, 7A, and 7B). As shown in FIG. 3, a block structure 200 of FIG. 2 can be secured to microelectrode sheet 305 to form a microfluidic device 300 defining a micro-channel 310. Microfluidic device 300 can be used to detect a biomarker.

Block structure 200 includes a recess 205 for receiving a microelectrode sheet 305. Recess 205 includes a micro-channel recess 210 that is adapted to form micro-channel 310 when microelectrode sheet 305 is secured in recess 205. Microelectrode sheet 305 is placed in recess 205 with the conductive pattern side positioned against block structure 200. A contact cutout 280 allows for contact pads to be exposed so that a power source can provide a desired voltage to each microelectrode and detect impedance data. In some cases, side portions of each conductive trace can be positioned on the microelectrode sheet 305 such that they extend outside of a side wall 212 of micro-channel 310 such that only interdigitated microelectrode segments are exposed to the contents of micro-channel 310.

A plurality of openings 272, 274, 276, and 278 are formed in the block structure 200 and can act as inlets or outlets to and from the micro-channel. Openings 272, 274, 276, and 278 each can have a diameter of about 800 microns. Opening 274 allows fluid to escape from micro-channel 310 and move further into the fluidic network passage, which can be located on a bottom side of block structure 200.

Micro-channel 310 can have a width of about 3.5 mm and a depth of about 50 microns. In some cases, a micro-channel can have a depth of at least 10 microns, at least 25 microns, at least 50 microns, at least 100 microns, at least 250 microns, or at least 500 microns. In some cases, the depth of micro-channel 310 can be less than 500 microns, less than 250 microns, less than 100 microns, less than 50 microns, less than 25 microns, or less than 10 microns. The width of micro-channel 310 can be greater than 1 mm, greater than 2 mm, greater than 3 mm, greater than 5 mm, or greater than 1.0 cm. The width of micro-channel 310 can be less than 1.0 cm, less than 5 mm, less than 4 mm, less than 3 mm, less than 2 mm, or less than 1 mm.

Block structure 200 can be formed by conventional molding and/or shaping techniques. In some cases, recess 205 and micro-channel recess 210 are machined into a block of material to form block structure 200. Flow paths can be machined into the block of material. In some cases, block structure 200 can also be injection molded. Block structure 200 can include a plastic material, such as poly(methyl methacrylate), polystyrene, polyester, polycarbonate, polyolefin, cyclic olefin copolymer, silicone, and/or polyurethane.

Probe molecules specific and complementary to one or more targets of interest can be immobilized in micro-channel 310. Probe molecules can be introduced into micro-channel 310 via openings 272, 274, 276, and 278. For example, probe molecules can be part of particles or beads.

Figure 4A:
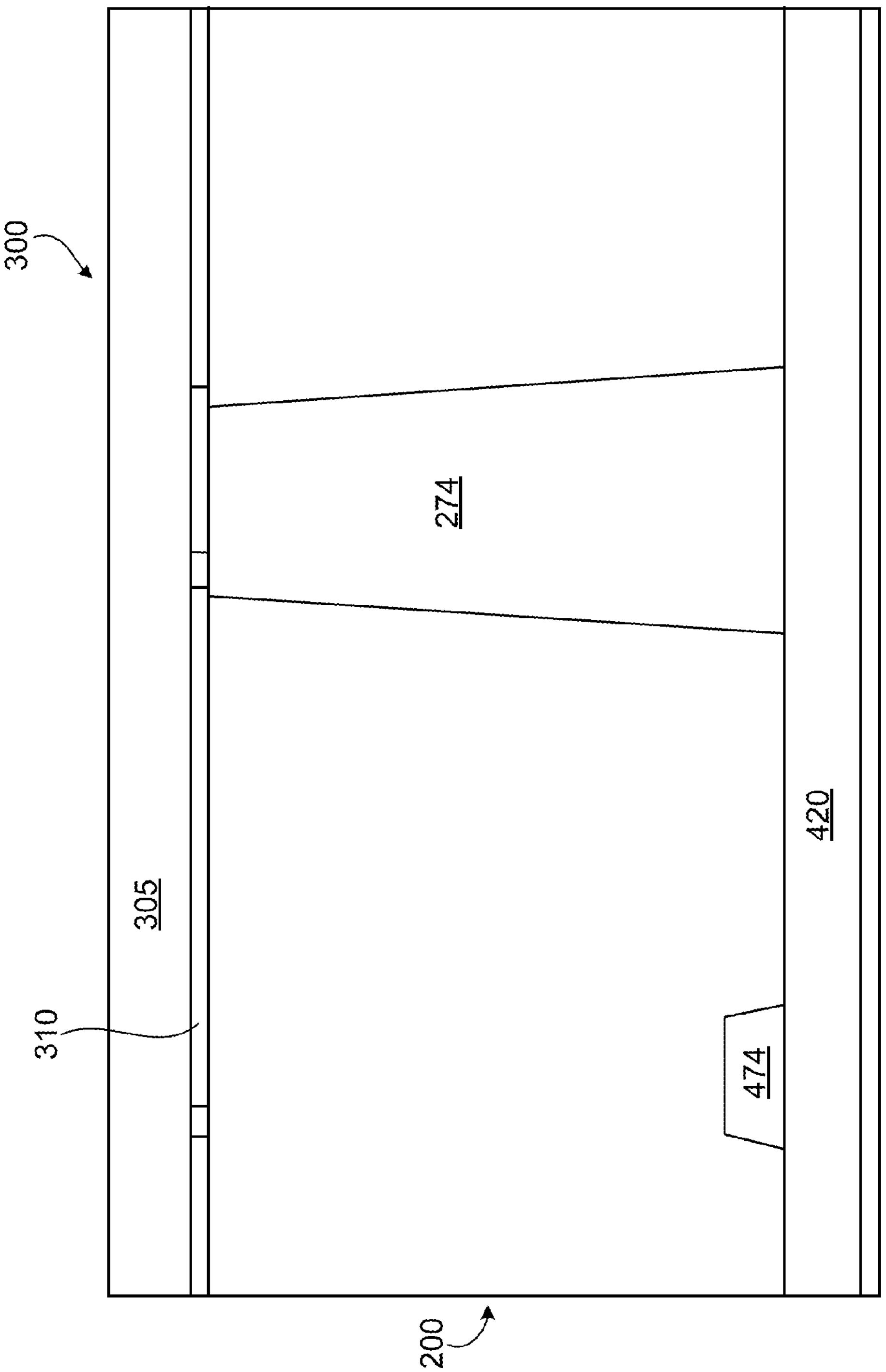
FIGS. 4A and 4B are cross-sectional views of a microfluidic device showing a micro-channel and flow paths defined by a block structure.
Figure 4B:
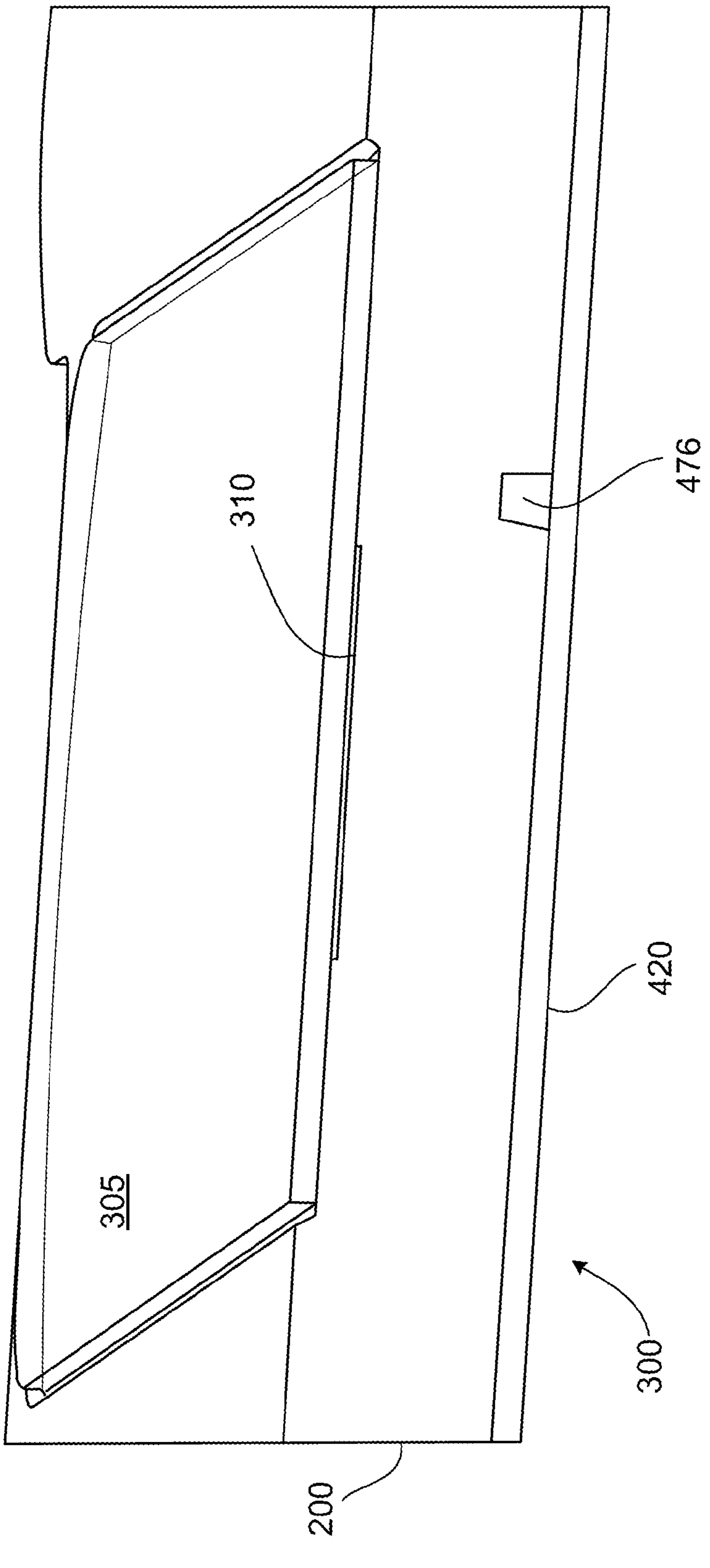

With reference to FIGS. 4A and 4B, microfluidic device 300 can have a micro-channel 310 and flow paths 274, 474, and 476 defined by block structure 200. A plurality of flow paths in a variety of arrangements can be defined by grooves, channels, and through holes formed in block structure 300. A film or other substrate 420 can be applied to the bottom of block structure 300 to cover the grooves and the channels. Block structure 200 can include a flow path for delivering a sample (e.g., blood) to micro-channel 310. Block structure 200 can include flow paths for delivering one or more reagents to the micro-channel 310. Block structure 200 can include an outlet flow path for evacuating micro-channel 310 to a waste compartment (e.g., a biological waste compartment).

Figure 5A:
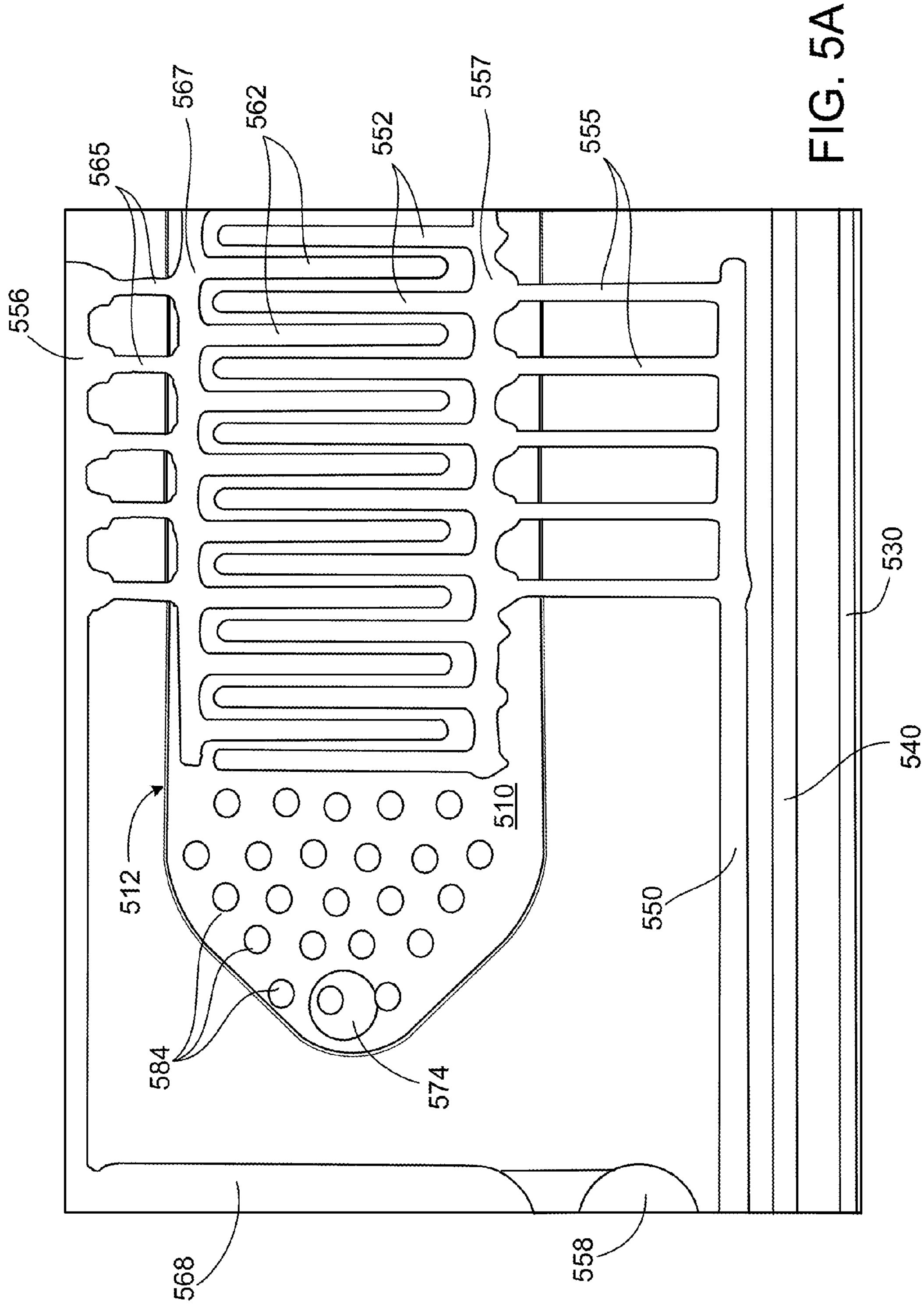
FIGS. 5A and 5B are detailed views of opposite ends of a micro-channel of a microfluidic device.
Figure 5B:
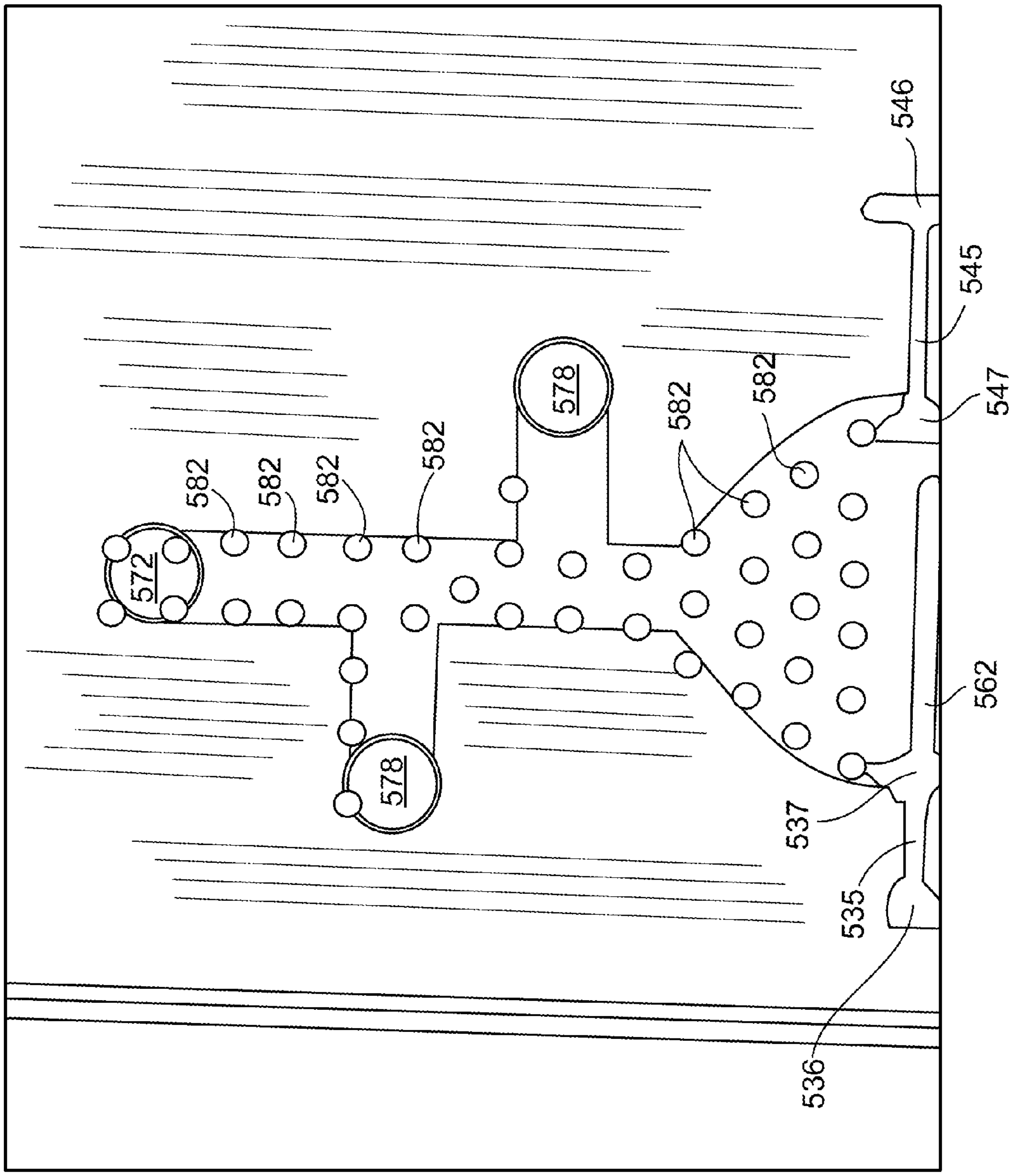

With reference to FIGS. 5A and 5B, a micro-channel 510 can be defined by side wall 512 of a block structure. A plurality of flow-modifying structures 582 and 584 are positioned near openings 572, 574, 576, and 578 at either end of micro-channel 510. As described above, flow-modifying structures 582 and 584 can have a different hydrophilicity and/or surface energy than the surrounding materials. In some cases, the flow-modifying structures 582 and 584 have a thickness of 1 micron or less. In some cases, the flow-modifying structures can be electrically connected to a power source to apply a potential to the flow-modifying structures. The flow-modifying structures 582 and 584 are arranged in an off-set pattern of squares to encourage a slalom type fluid flow paths that can increase the mixing of the sample and/or reagents as they enter and/or exit the micro-channel 510.

Conductive traces 530, 540, 550, and 560 each include a plurality of interdigitated microelectrodes 532, 543, 552, and 562 that are connected to conductive trace branch arms 537, 547, 557, and 567 that extend along at least a portion of the length of micro-channel 510 within micro-channel 510. Multiple redundant connectors 537, 547, 555, and 565 of each conductive trace connect branch arms 537, 547, 557, and 567 to microelectrode runners 536, 546, 556, and 566 that extend along micro-channel 510 outside of micro-channel 510. Multiple redundant connectors 535, 545, 555, and 565 can ensure a proper electrical connection between the contact pads (e.g., 558 and 568), even if a process of securing the microelectrode sheet to a block structure melts and/or disconnects one or more of connectors 535, 545, 555, and 565 extending into micro-channel 510. For example, laser or thermal welding might break one or more of redundant connectors 555 and 565.

Figure 6A:
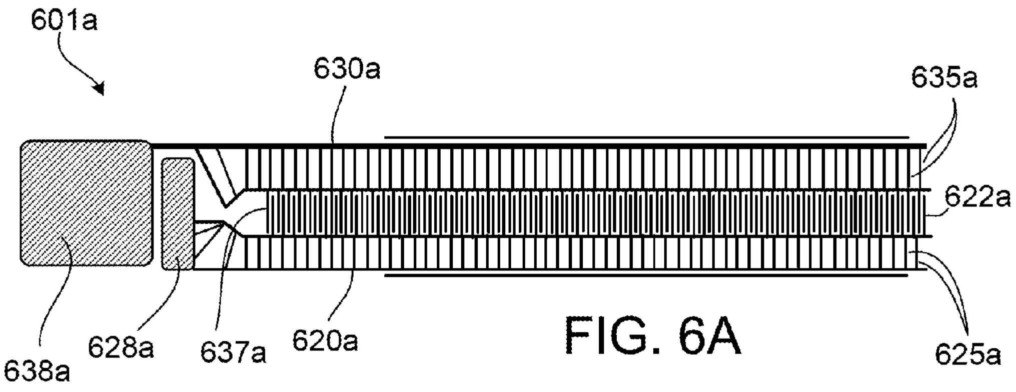
FIGS. 6A-6C are top views of exemplary conductive patterns that can be used in microfluidic devices.

With reference to FIG. 6A, a conductive pattern 601*a* can have two conductive traces 620*a* and 630*a*. Each conductive trace can include a contact pad 628*a* and 638*a* and a plurality of interdigitated microelectrodes 622*a* and 632*a*. A plurality of redundant connectors 625*a* and 635*a* are positioned to cross over a weld line (not shown) that seals a microelectrode sheet to a block structure to form a micro-channel.

Figure 6B:
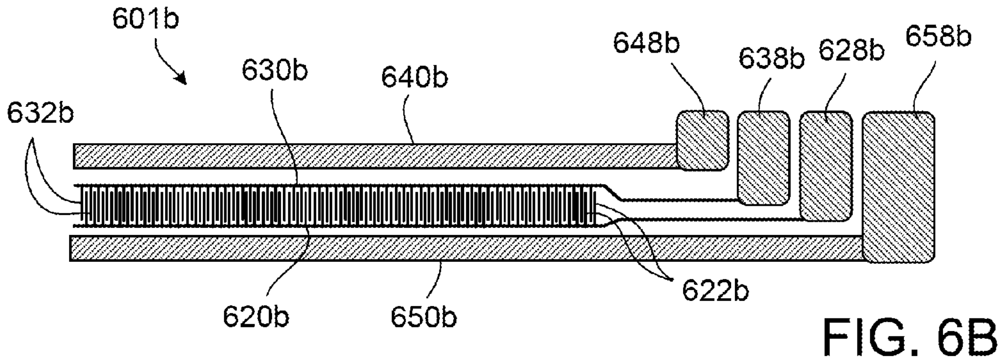

With reference to FIG. 6B, a conductive pattern 601*b* can have four conductive traces 620*b*, 630*b*, 640*b*, and 650*b*. Each conductive trace can include a contact pad 628*b*, and 638*b*, 648*b*, and 658*b*. Conductive traces 620*b* and 630*b* include a plurality of interdigitated microelectrodes 622*b* and 632*b*. Broad outboard conductive traces 640*b* and 650*b* can be electrokinetic (iontophoretic) electrodes. When low milliamp current passes through broad outboard conductive traces 640*c* and 650*c*, charge carriers are transported to the opposite poles. Broad outboard conductive traces 640*b* and 650*b* could be used to segregate components selectively in a micro-channel.

Figure 6C:
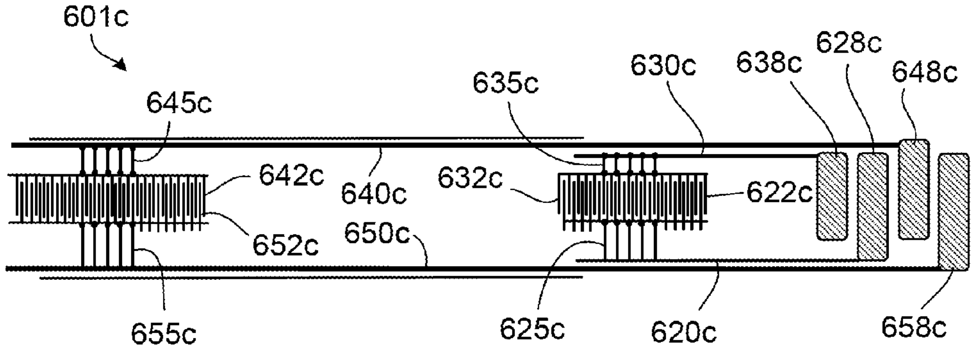

With reference to FIG. 6C, a conductive pattern 601*c* can have two sets of two conductive traces, a first set of conductive traces 620*c* and 630*c* and a second set of conductive traces 640*c* and 650*c*. Each conductive trace can have a charge pad 628*c*, 638*c*, 648*c*, and 658*c*, redundant connectors 625*c*, 635*c*, 645*c*, and 655*c*, and interdigitated microelectrodes 622*c*, 632*c*, 642*c*, and 652*c*. Each set can report the impedance within an area of a micro-channel corresponding to the positioning of the interdigitated microelectrodes for that set. This can be used to monitor the rate of change of impedance as the liquid flows through a micro-channel or can be used to monitor different events occurring at different points in a micro-channel.

Figure 7A:
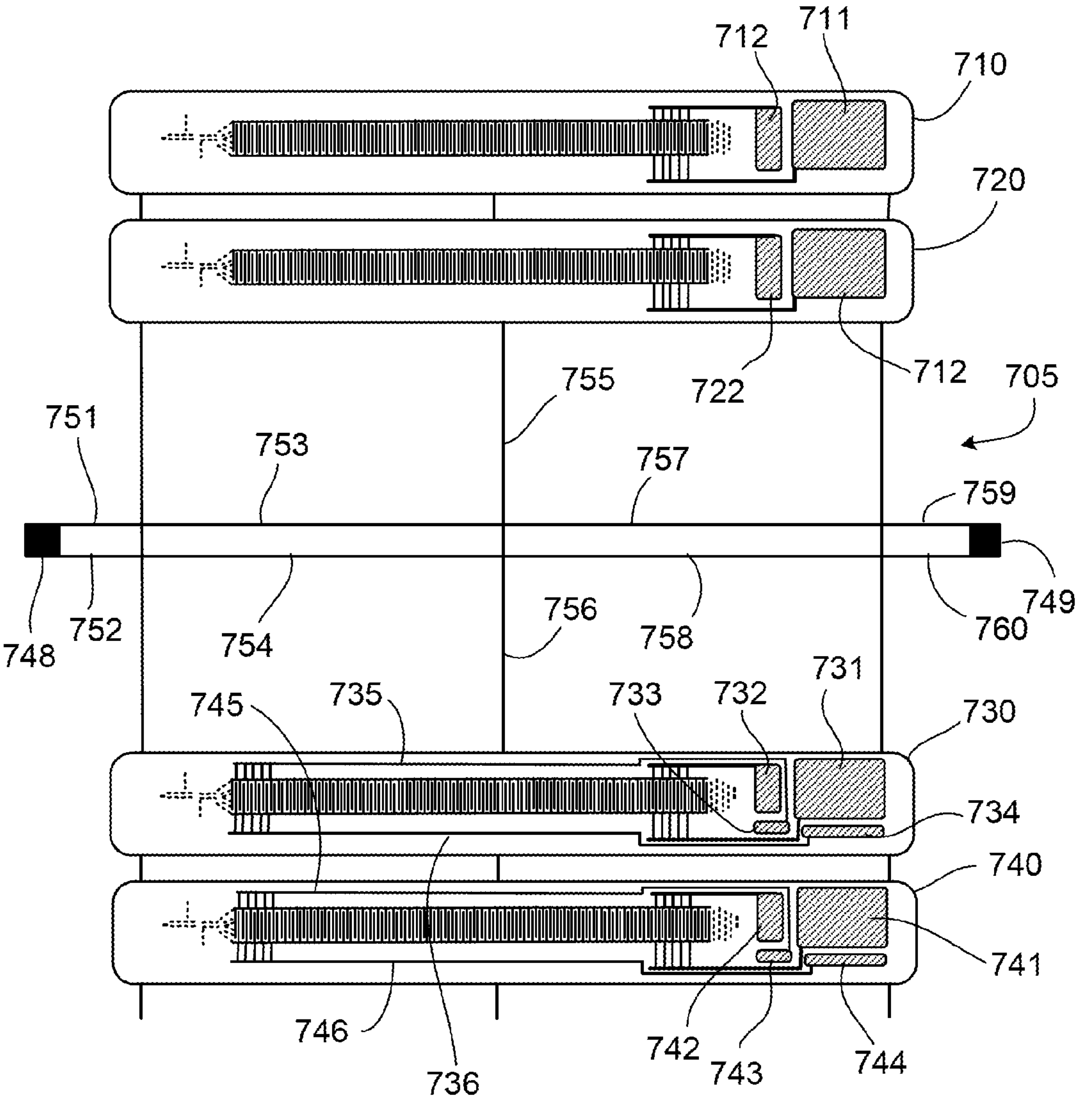
FIGS. 7A and 7B are top views of exemplary conductive patterns that can be printed on a single receiving substrate and separated to form multiple microelectrode sheets.
Figure 7B:
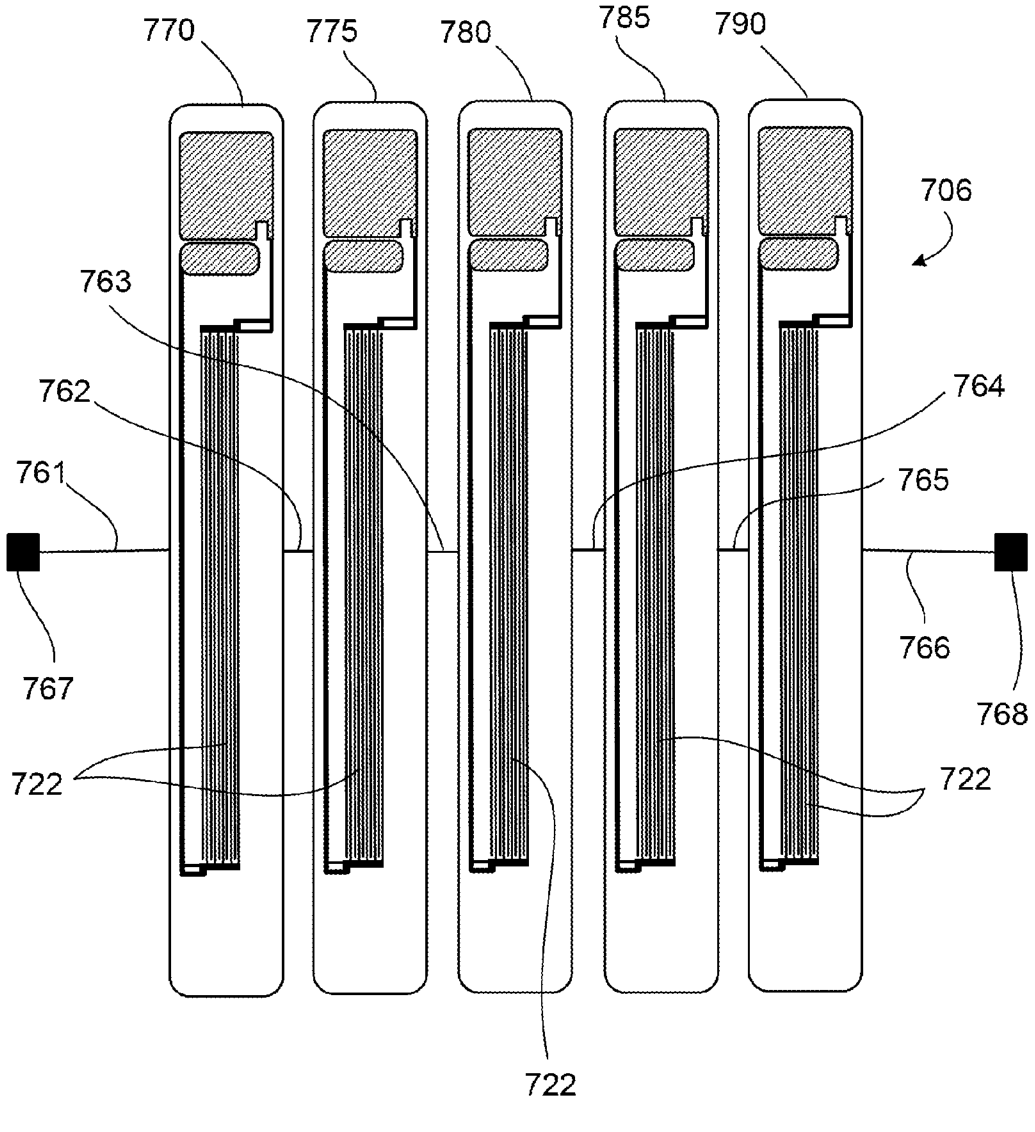

With reference to FIGS. 7A and 7B, multiple conductive patterns can be printed on a single substrate and cut for use in separate devices. With reference to FIG. 7A, a single sheet of receiving substrate 705 can receive multiple conductive patterns that can be die cut into separate microelectrode sheets 710, 720, 730, and 740. Microelectrode sheets 710 and 720 have a first conductive pattern design while microelectrode sheets 730 and 740 have a second conductive pattern design. Both designs can be used in the same microfluidic device. The second conductive pattern design can have a quality control feature that allows for the integrity of each electrode to be tested.

Sheets 710 and 720 can each include two conductive traces. Each conductive trace can include a single contact pad 711, 712, 713, and 714. Sheets 730 and 740 can also each include two conductive traces, but each conductive trace includes two contact pads. For each conductive trace of sheets 730 and 740, the integrity of the conductive traces can be tested by applying a voltage across the conductive traces using the two contact pads provided for that conductive trace. For example, upper conductive trace of sheet 730 includes contact pads 732 and 733 and a runner 735 that connects all of the microelectrodes of between the two contact pads 732 and 733. A bottom conductive trace of sheet 730 includes contact pads 731 and 734 and a runner 736 that connects all of the microelectrodes of between the two contact pads 731 and 734. Upper conductive trace of sheet 740 includes contact pads 742 and 743 and a runner 745. Bottom conductive trace of sheet 740 includes contact pads 741 and 744 and a runner 746. Lines 751-760 tie the patterns together to ensure that the thermal printhead treats the four patterns of sheets 710, 720, 730, and 740 as one pattern. This can reduce or eliminate the positional variation during a print run. Small squares 748 and 749 are the fiducial marks that a vision system uses to die-cut receiving substrate 705.

With respect to FIG. 7B, an arrangement of five microelectrode sheets 770, 775, 780, 785, and 790 can be transfer printed on a single receiving substrate 706. This arrangement can have interdigitated microelectrodes that run along the length of a micro-channel. Lines 761-766 can tie the patterns together to ensure that the thermal printhead treats the five conductive patterns of sheets 770, 775, 780, 785, and 790 as one pattern. This can reduce or eliminate the positional variation during a print run. Small squares 767 and 768 can be used as fiducial marks that a vision system uses to die-cut receiving substrate 706.

It is to be understood that while the thermal transfer printing of conductive patterns has been described in conjunction with the detailed description thereof, the foregoing description is intended to illustrate and not limit the scope of the appended claims. Other aspects, advantages, and modifications are within the scope of the following claims.

What is claimed is:

1. A method for manufacturing an electric sensor, comprising:

(a) thermal transfer printing a conductive pattern defining at least one conductive trace onto a surface of a receiving substrate; and (b) securing at least a portion of the receiving substrate to at least a second substrate to form an enclosure, wherein at least a portion of the conductive pattern is positioned within the enclosure, wherein the sensor is a microfluidic device and the conductive pattern defines at least two electrodes positioned within a micro-channel of the microfluidic device, and wherein the conductive pattern comprises interdigitated microelectrodes.

2. A method for manufacturing an electric sensor, comprising:

(a) thermal transfer printing a conductive pattern defining at least one conductive trace onto a surface of a receiving substrate; and (b) securing at least a portion of the receiving substrate to at least a second substrate to form an enclosure, wherein at least a portion of the conductive pattern is positioned within the enclosure, wherein the conductive pattern is printed with a thermal transfer printer having a printhead density of at least 300 dpi.

3. The method of claim 2, wherein the sensor is a microfluidic device and the conductive pattern defines at least two electrodes positioned within a micro-channel of the microfluidic device.

4. The method of claim 2, wherein the conductive pattern has at least a portion having a thickness of 1 micron or less.

5. The method of claim 2, wherein the conductive pattern has at least one conductive trace having at least a portion having a width of 250 microns or less.

6. The method of claim 2, wherein the conductive pattern has at least one conductive trace having at least a portion having a width of 50 microns or less.

7. The method of claim 2, wherein the conductive pattern comprises aluminum, silver, platinum, iron, graphite, or a derivative or combination thereof.

8. The method of claim 7, wherein the conductive pattern comprises particles of aluminum, silver, platinum, iron, graphite, or a combination thereof.

9. A method for manufacturing an electric sensor, comprising:

(a) thermal transfer printing a conductive pattern defining at least one conductive trace onto a surface of a receiving substrate; and (b) securing at least a portion of the receiving substrate to at least a second substrate to form an enclosure, wherein at least a portion of the conductive pattern is positioned within the enclosure, wherein the conductive pattern comprises one or more conductive polymers.

10. A method for manufacturing an electric sensor, comprising:

(a) thermal transfer printing a conductive pattern defining at least one conductive trace onto a surface of a receiving substrate; and (b) securing at least a portion of the receiving substrate to at least a second substrate to form an enclosure, wherein at least a portion of the conductive pattern is positioned within the enclosure, wherein the enclosure comprises a fluid.

11. The method of claim 10, wherein the fluid comprises vapor.

12. The method of claim 10, wherein the fluid comprises a reagent.

13. A method for manufacturing an electric sensor, comprising:

(a) thermal transfer printing a conductive pattern defining at least one conductive trace onto a surface of a receiving substrate; and (b) securing at least a portion of the receiving substrate to at least a second substrate to form an enclosure, wherein at least a portion of the conductive pattern is positioned within the enclosure, wherein the non-conductive surface comprise a biological coating.

14. An electric sensor, comprising:

(a) an enclosure; and (b) a plurality of thermal-transfer-printed conductive traces positioned at least partially within the enclosure wherein the conductive traces comprise interdigitated microelectrodes.

15. The sensor of claim 14, wherein the sensor is a microfluidic device and the enclosure comprises a micro-channel and the plurality of conductive traces are at least partially positioned within the micro-channel.

16. The sensor of claim 14, wherein the conductive traces have one or more portions having a thickness of 1 micron or less.

17. The sensor of claim 14, wherein the conductive traces have one or more portions having a width of 500 microns or less.

18. The sensor of claim 14, wherein the conductive traces comprises particles of aluminum, silver, platinum, iron, graphite, or a combination thereof.

19. An electric sensor, comprising:

(a) an enclosure; and (b) a plurality of thermal-transfer-printed conductive traces positioned at least partially within the enclosure wherein the plurality of thermal-transfer-printed conductive traces are printed on a biological coating.

20. An electric sensor, comprising:

(a) an enclosure; and (b) a plurality of thermal-transfer-printed conductive traces positioned at least partially within the enclosure wherein the conductive traces have a first surface energy that is at least 5 Dynes/cm greater or lower than a surface energy of a surrounding material.

21. A microfluidic sensor comprising a body defining at least a first microfluidic channel, the microfluidic channel having at least one surface comprising at least two different materials, wherein a first material has a first surface energy and a second material comprises a second surface energy that is at least 5 Dynes/cm greater than the first surface energy.

22. The microfluidic sensor of claim 21, wherein the second material comprises thermal transfer printed material.

23. The microfluidic sensor of claim 21, wherein the second material has a surface energy of greater than 45 Dynes/cm.

24. The microfluidic sensor of claim 23, wherein the second material has a surface energy of greater than 60 Dynes/cm.

25. The microfluidic sensor of claim 21, wherein the second material comprises a conductive material.

26. The microfluidic sensor of claim 25, wherein one or more portions of the second material are connected to a power source to apply a potential to the second material to change wetting properties of the second material.

27. The microfluidic sensor of claim 25, wherein the second material comprises aluminum particles.

28. The microfluidic sensor of 21, wherein the first material has a surface energy of less than 45 Dynes/cm.

29. The microfluidic sensor of claim 28, wherein the first material has a surface energy of less than 40 Dynes/cm.

30. The microfluidic sensor of claim 21, wherein the first material comprises pMMA.

31. The microfluidic sensor of claim 21, wherein the second material has a thickness of 1 micron or less.

32. The method of claim 1, wherein the conductive pattern has at least a portion having a thickness of 1 micron or less.

33. The method of claim 1, wherein the conductive pattern has at least one conductive trace having at least a portion having a width of 250 microns or less.

34. The method of claim 1, wherein the conductive pattern has at least one conductive trace having at least a portion having a width of 50 microns or less.

35. The method of claim 1, wherein the conductive pattern is printed with a thermal transfer printer having a printhead density of at least 300 dpi.

36. The method of claim 1, wherein the conductive pattern comprises aluminum, silver, platinum, iron, graphite, or a derivative or combination thereof.

37. The method of claim 36, wherein the conductive pattern comprises particles of aluminum, silver, platinum, iron, graphite, or a combination thereof.

38. The method of claim 1, wherein the conductive pattern comprises one or more conductive polymers.

39. The method of claim 1, wherein the enclosure comprises a fluid.

40. The method of claim 39, wherein the fluid comprises a reagent.

41. The method of claim 39, wherein the fluid comprises vapor.

42. The method of claim 1, wherein the non-conductive surface comprise a biological coating.

43. The method of claim 2, wherein the conductive pattern comprises interdigitated microelectrodes.

44. The method of claim 2, wherein the conductive pattern comprises one or more conductive polymers.

45. The method of claim 2, wherein the enclosure comprises a fluid.

46. The method of claim 45, wherein the fluid comprises a reagent.

47. The method of claim 45, wherein the fluid comprises vapor.

48. The method of claim 2, wherein the non-conductive surface comprise a biological coating.

49. The method of claim 9, wherein the sensor is a microfluidic device and the conductive pattern defines at least two electrodes positioned within a micro-channel of the microfluidic device.

50. The method of claim 9, wherein the conductive pattern has at least a portion having a thickness of 1 micron or less.

51. The method of claim 9, wherein the conductive pattern has at least one conductive trace having at least a portion having a width of 250 microns or less.

52. The method of claim 9, wherein the conductive pattern has at least one conductive trace having at least a portion having a width of 50 microns or less.

53. The method of claim 9, wherein the conductive pattern comprises interdigitated microelectrodes.

54. The method of claim 9, wherein the conductive pattern is printed with a thermal transfer printer having a printhead density of at least 300 dpi.

55. The method of claim 9, wherein the conductive pattern comprises aluminum, silver, platinum, iron, graphite, or a derivative or combination thereof.

56. The method of claim 9, wherein the conductive pattern comprises particles of aluminum, silver, platinum, iron, graphite, or a combination thereof.

57. The method of claim 9, wherein the enclosure comprises a fluid.

58. The method of claim 57, wherein the fluid comprises a reagent.

59. The method of claim 57, wherein the fluid comprises vapor.

60. The method of claim 9, wherein the non-conductive surface comprise a biological coating.

61. The method of claim 12, wherein the sensor is a microfluidic device and the conductive pattern defines at least two electrodes positioned within a micro-channel of the microfluidic device.

62. The method of claim 12, wherein the conductive pattern has at least a portion having a thickness of 1 micron or less.

63. The method of claim 12, wherein the conductive pattern has at least one conductive trace having at least a portion having a width of 250 microns or less.

64. The method of claim 12, wherein the conductive pattern has at least one conductive trace having at least a portion having a width of 50 microns or less.

65. The method of claim 12, wherein the conductive pattern comprises interdigitated microelectrodes.

66. The method of claim 12, wherein the conductive pattern is printed with a thermal transfer printer having a printhead density of at least 300 dpi.

67. The method of claim 12, wherein the conductive pattern comprises aluminum, silver, platinum, iron, graphite, or a derivative or combination thereof.

68. The method of claim 12, wherein the conductive pattern comprises particles of aluminum, silver, platinum, iron, graphite, or a combination thereof.

69. The method of claim 12, wherein the conductive pattern comprises one or more conductive polymers.

70. The method of claim 12, wherein the non-conductive surface comprise a biological coating.

71. The method of claim 13, wherein the sensor is a microfluidic device and the conductive pattern defines at least two electrodes positioned within a micro-channel of the microfluidic device.

72. The method of claim 13, wherein the conductive pattern has at least a portion having a thickness of 1 micron or less.

73. The method of claim 13, wherein the conductive pattern has at least one conductive trace having at least a portion having a width of 250 microns or less.

74. The method of claim 13, wherein the conductive pattern has at least one conductive trace having at least a portion having a width of 50 microns or less.

75. The method of claim 13, wherein the conductive pattern comprises interdigitated microelectrodes.

76. The method of claim 13, wherein the conductive pattern is printed with a thermal transfer printer having a printhead density of at least 300 dpi.

77. The method of claim 13, wherein the conductive pattern comprises aluminum, silver, platinum, iron, graphite, or a derivative or combination thereof.

78. The method of claim 13, wherein the conductive pattern comprises particles of aluminum, silver, platinum, iron, graphite, or a combination thereof.

79. The method of claim 13, wherein the conductive pattern comprises one or more conductive polymers.

80. The method of claim 13, wherein the enclosure comprises a fluid.

81. The method of claim 80, wherein the fluid comprises a reagent.

82. The method of claim 80, wherein the fluid comprises vapor.

83. The sensor of claim 14, wherein the plurality of thermal-transfer-printed conductive traces are printed on a biological coating.

84. The sensor of claim 14, wherein the conductive traces have a first surface energy that is at least 5 Dynes/cm greater or lower than a surface energy of a surrounding material.

85. The sensor of claim 19, wherein the sensor is a microfluidic device and the enclosure comprises a micro-channel and the plurality of conductive traces are at least partially positioned within the micro-channel.

86. The sensor of claim 19, wherein the conductive traces comprise interdigitated microelectrodes.

87. The sensor of claim 19, wherein the conductive traces have one or more portions having a thickness of 1 micron or less.

88. The sensor of claim 19, wherein the conductive traces have one or more portions having a width of 500 microns or less.

89. The sensor of claim 19, wherein the conductive traces comprises particles of aluminum, silver, platinum, iron, graphite, or a combination thereof.

90. The sensor of claim 19, wherein the conductive traces have a first surface energy that is at least 5 Dynes/cm greater or lower than a surface energy of a surrounding material.

91. The sensor of claim 20, wherein the sensor is a microfluidic device and the enclosure comprises a micro-channel and the plurality of conductive traces are at least partially positioned within the micro-channel.

92. The sensor of claim 20, wherein the conductive traces comprise interdigitated microelectrodes.

93. The sensor of claim 20, wherein the conductive traces have one or more portions having a thickness of 1 micron or less.

94. The sensor of claim 20, wherein the conductive traces have one or more portions having a width of 500 microns or less.

95. The sensor of claim 20, wherein the conductive traces comprises particles of aluminum, silver, platinum, iron, graphite, or a combination thereof.

96. The sensor of claim 22, wherein the plurality of thermal-transfer-printed conductive traces are printed on a biological coating.

* * * * *

UNITED STATES PATENT AND TRADEMARK OFFICE
CERTIFICATE OF CORRECTION

PATENT NO. : 9,221,050 B2
APPLICATION NO. : 13/464555
DATED : December 29, 2015
INVENTOR(S) : Robert Winston Etheredge, III and Aaron Oppenheimer It is certified that error appears in the above-identified patent and that said Letters Patent is hereby corrected as shown below:

Claims

Column 16, line 15 (Claim 28), please delete "of 21," and insert -- of claim 21, --, therefor;

Column 17, line 27 (Claim 61), please delete "claim 12," and insert -- claim 10 --, therefor;

Column 17, line 31 (Claim 62), please delete "claim 12," and insert -- claim 10 --, therefor;

Column 17, line 34 (Claim 63), please delete "claim 12," and insert -- claim 10 --, therefor;

Column 17, line 37 (Claim 64), please delete "claim 12," and insert -- claim 10 --, therefor;

Column 17, line 40 (Claim 65), please delete "claim 12," and insert -- claim 10 --, therefor;

Column 17, line 42 (Claim 66), please delete "claim 12," and insert -- claim 10 --, therefor;

Column 17, line 45 (Claim 67), please delete "claim 12," and insert -- claim 10 --, therefor;

Column 17, line 48 (Claim 68), please delete "claim 12," and insert -- claim 10 --, therefor;

Column 17, line 51 (Claim 69), please delete "claim 12," and insert -- claim 10 --, therefor;

Column 17, line 51 (Claim 69), please delete "claim 12," and insert -- claim 10 --, therefor;

Column 17, line 53 (Claim 70), please delete "claim 12," and insert -- claim 10 --, therefor;

Column 18, line 61 (Claim 96), please delete "claim 22," and insert -- claim 20 --, therefor.

Signed and Sealed this
Seventh Day of June, 2016

Michelle K. Lee

Michelle K. Lee
*Director of the United States Patent and Trademark Office*